(12) United States Patent
Loizeau et al.

(10) Patent No.: US 10,273,093 B2
(45) Date of Patent: Apr. 30, 2019

(54) CONVEYOR WITH A PUSH-PULL MECHANISM FOR A LOAD SEPARATOR

(71) Applicant: Interroll Holding AG, Sant' Antonino (CH)

(72) Inventors: Antoine Loizeau, Saint German du Princay (FR); Patrick Guitton, La Roche-sur-Yon (FR)

(73) Assignee: INTERROLL HOLDING AG (CH)

( * ) Notice: Subject to any disclaimer, the term of this patent is extended or adjusted under 35 U.S.C. 154(b) by 0 days.

(21) Appl. No.: 15/754,035

(22) PCT Filed: Aug. 24, 2016

(86) PCT No.: PCT/EP2016/001433
§ 371 (c)(1),
(2) Date: Feb. 21, 2018

(87) PCT Pub. No.: WO2017/032456
PCT Pub. Date: Mar. 2, 2017

(65) Prior Publication Data
US 2018/0244479 A1    Aug. 30, 2018

(30) Foreign Application Priority Data

Aug. 25, 2015  (EP) .................................... 15290215

(51) Int. Cl.
*B65G 47/88*  (2006.01)
*B65G 13/075*  (2006.01)
*B65G 13/11*  (2006.01)

(52) U.S. Cl.
CPC ....... *B65G 47/8823* (2013.01); *B65G 13/075* (2013.01); *B65G 13/11* (2013.01); *B65G 2201/0267* (2013.01); *B65G 2205/04* (2013.01)

(58) Field of Classification Search
CPC ...... B65G 13/075; B65G 13/11; B65G 47/29; B65G 47/295; B65G 47/8807;
(Continued)

(56) References Cited

U.S. PATENT DOCUMENTS 4,646,909 A * 3/1987 vom Stein ............... B65G 1/08
193/35 A
5,213,189 A * 5/1993 Agnoff ............... B65G 47/8823
193/35 A
(Continued)

FOREIGN PATENT DOCUMENTS

DE    43 09 222    9/1993
DE    94 04 684    5/1994
(Continued)

OTHER PUBLICATIONS

International Search Report dated Oct. 21, 2016.

*Primary Examiner* — Gene O Crawford
*Assistant Examiner* — Keith R Campbell
(74) *Attorney, Agent, or Firm* — Gerald E. Hespos; Michael J. Porco; Matthew T. Hespos

(57) ABSTRACT

A conveyor for conveying loads along a conveying direction has a frame and a plurality of rollers mounted in the frame. The conveyor also has a trigger pedal movable between an idle position and an engaged position, and a separator stop movable between a retracted position and a protruding position. A coupling is between the trigger pedal and the separator stop for transmitting to the separator stop a movement applied to the trigger pedal. A manual release mechanism also is provided. The frame has an end portion positioned after the plurality of rollers in the conveying direction. The manual release mechanism is arranged in the end portion and the trigger pedal is arranged within the end portion. The coupling has a knee-joint mechanism and is
(Continued)

configured to pull the separator stop in the protruding position and to push the separator stop in the retracted position.

10 Claims, 4 Drawing Sheets

(58) Field of Classification Search
CPC ............ B65G 47/8815; B65G 47/8823; B65G 47/8869; B65G 47/8876; B65G 47/8884; B65G 2201/0267; B65G 2205/04
USPC .............................................. 193/35 A, 35 G
See application file for complete search history.

(56) References Cited

U.S. PATENT DOCUMENTS

| | | | |
|---|---|---|---|
| 5,890,577 A | 4/1999 | Faisant | |
| 6,189,672 B1 * | 2/2001 | Schut | B65G 1/08 193/35 A |
| 8,544,635 B2 * | 10/2013 | Sejourne | B65G 47/261 198/781.05 |
| 8,820,506 B2 * | 9/2014 | Sejourne | B65G 1/08 193/35 A |
| 9,187,248 B2 * | 11/2015 | Ribau | B65G 47/8823 |

FOREIGN PATENT DOCUMENTS

| | | | |
|---|---|---|---|
| DE | 103 03 508 | 8/2004 | |
| EP | 31 29 318 | 2/1983 | |
| EP | 1 050 491 | 3/2000 | |
| ES | 2 323 105 | 7/2009 | |
| GB | 2 235 672 | 3/1991 | |
| GB | 2235672 A * | 3/1991 | ............... B65G 1/08 |
| GB | 2 236 294 | 4/1991 | |

* cited by examiner

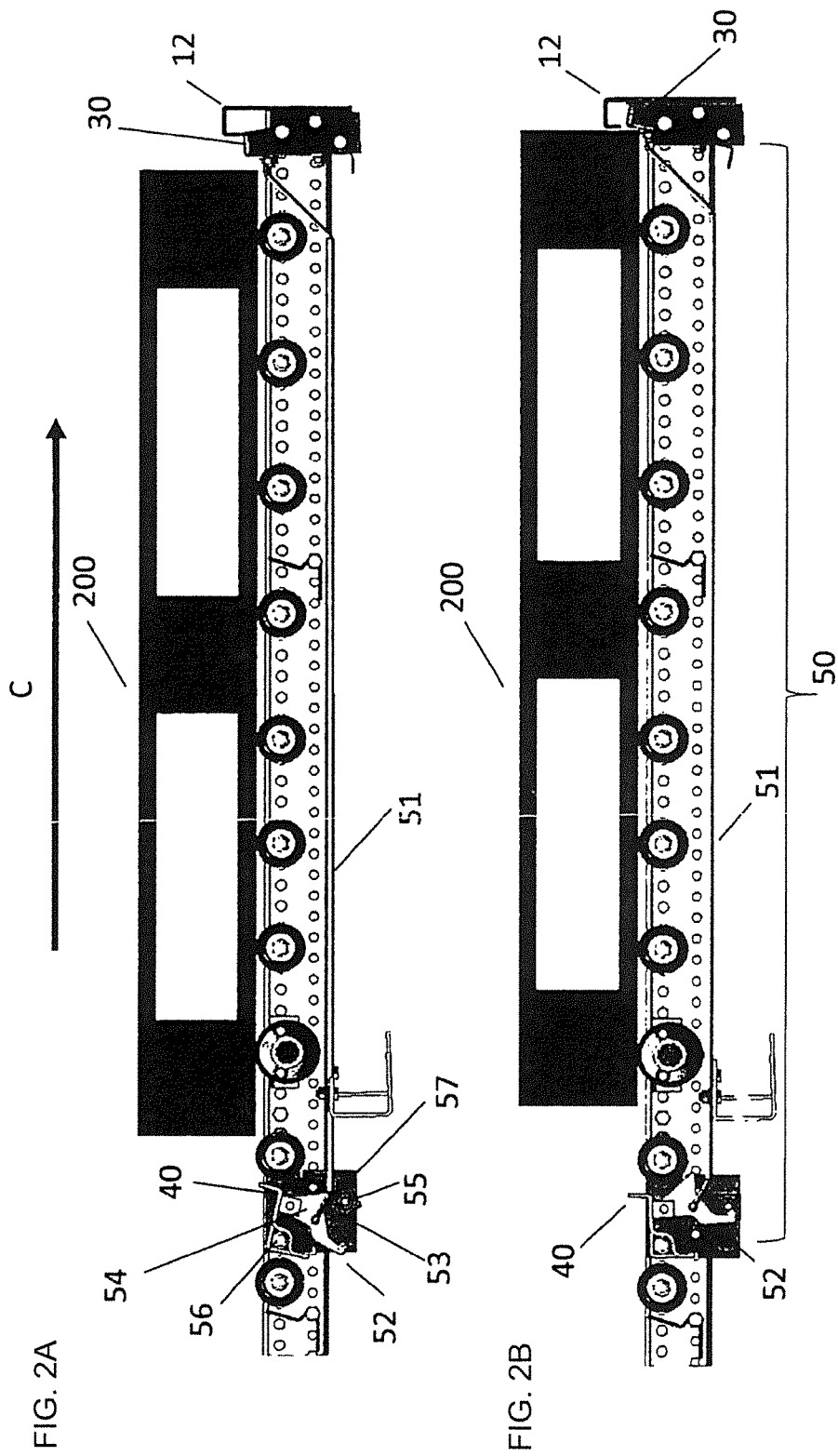

CONVEYOR WITH A PUSH-PULL MECHANISM FOR A LOAD SEPARATOR

BACKGROUND

Field of the Invention

The following description relates to a conveyor for conveying loads comprising a load separator device.

Description of the Related Art

Conveyors comprising a plurality of rollers are commonly used for transporting loads. The rollers determine a track on which the loads, such as pallets, are transported towards a discharge end of the conveyor, where the loads are unloaded by e.g. a forklift operator.

In order to enable the forklift operator to easily extract the end load (i.e. the first load reaching the discharge end), in particular by preventing the accumulation of other loads exerting pressure against the end load, a load separator device is commonly used in proximity of the discharge end. The load separator device is configured to isolate at least the end load, located downstream on the conveyor, with respect to the other loads which are waiting upstream.

These separator devices comprise a pedal and a stop, interconnected by a pole or a tie-shaped linking rod as coupling. The pedal is accommodated at the end of the conveyor and is designed to be actuated by the end load. The stop is used to retain the upstream loads in order to separate them from the load located at the downstream end. This stop is brought into active separating position by the pedal when the latter is actuated by the end downstream load and it is deactuated when said downstream load is removed. The removal allows the following load to take its place at the discharge end and actuates, in turn, the pedal as well as the retaining stop for the other loads.

DE 3129318 A1 describes a separator device comprising a stop bolt articulated on a leg of a toggle lever and connected via a linkage to a pedal. The pedal is connected to two springs, wherein one spring is pushed all the way to the toggle lever, when downward pressure is applied to the pedal, in order to trigger the stop bolt by pushing it upward. The other spring automatically releases the stop bolt once the pressure applied to the pedal ceases.

It is an object of the invention to provide an alternative and improved separator device for a conveyor.

SUMMARY

According to one aspect of the invention, a conveyor for conveying loads along a conveying direction comprises a frame arranged in the conveying direction and a plurality of rollers mounted in the frame and arranged rotatable in the conveying direction. To provide a separating function, the conveyor further comprises a trigger pedal movable between an idle position and an engaged position, a separator stop movable between a retracted position and a protruding position, and a coupling between the trigger pedal and the separator stop for transmitting to the separator stop a movement applied to the trigger pedal.

The tops of the plurality of rollers may be seen as forming a conveying surface. In other words, the top sides of the cylinder mantles of the rollers may be virtually joined to form a conveying surface parallel to the surface defined by the frame. The idle position is the position of the trigger pedal when the separator stop is not activated, i.e. when the separator stop is in the retracted position below the conveying surface. In this position, the trigger pedal is ready to be activated or engaged by an oncoming load or by any force applied to it. The movement out of the idle position may be caused by a load moving along the conveyor and moving the trigger pedal with its weight. After the trigger pedal has been moved into the engaged position, the trigger pedal remains in said position.

The retracted position of the separator stop is the position in which the separator stop is below the conveying surface. Thus, the separator stop does not interact with the loads when in the retracted position, since the loads are conveyed above the conveying surface. When a movement is applied to the trigger pedal, e.g. when a pressure or force is exerted on the trigger pedal by a load from a lateral direction, the coupling moves the separator stop from the retracted position into the protruding position. When in the protruding position, the separator stop protrudes above the conveying surface, i.e. beyond the rollers. Consequently, the separator stop can serve as a barrier for a load subsequent to an end load that has engaged the trigger pedal.

The frame of the conveyor has an end portion positioned after the plurality of rollers in the conveying direction. The end portion of the frame is located within the discharge area of the conveyor from which the loads are unloaded. The trigger pedal is arranged within the end portion.

Exemplarily, the end portion may comprise the end part of the beams after the plurality of rollers and a block placed orthogonally to two lateral beams, which are part of the frame. The block may have a length equal to the distance between the two lateral beams. The block of the end portion may comprise an internal wall, a top panel and an external wall, with the walls being parallel to the rollers and transversal to the lateral beams. The block may also comprise a bottom panel opposite the top panel. The block preferably consists of a profile e.g. of metal.

The external wall may be farther from the rollers than the internal wall and may extend from the base of the lateral beams (or below) to a height above the rollers and the lateral beams. The external wall may be connected to the frame, directly and/or via additional lateral walls and/or the bottom panel. The external wall may be joined to the top panel at its upper end. Opposite to the external wall, the internal wall may be joined to the top panel. In a first example, the internal wall may extend downwards without reaching the conveying surface; in other words, a gap may be formed between the lower end of the internal wall and the conveying surface. In a second example, the internal wall may extend downwards until it reaches the lateral beams. Optionally, at the point at which the internal wall meets the lateral beams, the internal wall may bend at e.g. 90° to extend parallel to the lateral beams. In other words, the internal wall may have at least a first portion substantially perpendicular to the lateral beams and a consecutive second portion substantially parallel to the lateral beams. The second portion may be exemplarily fixed e.g. by means of a screw to one or both of the lateral beams. The interior of the block of the end portion (profile) may be at least partly hollow to accommodate at least partly the trigger pedal.

The trigger pedal may comprise one or more elements. In particular, in the first example, the trigger pedal may comprise one unitarily-formed element that is configured to be engaged by an incoming load to move in the engaged position and to be engaged by a release mechanism to move back in the idle position. In other words, the same unitarily-formed element may interact directly both with the load and with the release mechanism.

In the second example, the trigger pedal may comprise at least two different elements connected to each other, wherein a first element is configured to be engaged by an incoming load and a second element is configured to be engaged by the release mechanism. In other words, the load may exert pressure onto the first element of the trigger pedal, whereas the release mechanism may act in a direct way onto the second element of the trigger pedal. In any case, the two elements are connected so that any action performed on one of the two elements may be transmitted to the other. Exemplarily, the connection between the two elements may be a third element movably connected to the other two e.g. by means of joints. The second element (or release element) may be fully accommodated inside the profile of the end portion, whereas the first element (or engaging element) may be at least partly outside of the profile.

In the first example, the single-element trigger pedal in the idle position may at least partly protrude from the gap in the direction opposite the conveying direction, so that it can be engaged by an incoming load. The load, upon its arrival, may push the trigger pedal through the gap further into the end portion, i.e. into the hollow space of the block of the end portion, subsequently triggering the coupling to transmit the movement to the separator stop. In one example, the trigger pedal may pivot or rotate about an axis when subject to pressure or force.

In the second example, the two-element trigger pedal in the idle position may have the engaging element at least partially protruding above the conveying surface, so that it can be engaged by an incoming load. The load, upon its arrival, may push the engaging element further away from the plurality of rollers towards the block of the end profile, which may stop the load. The movement of the engaging element is transmitted via the coupling to the separator stop. In one example, the engaging element may pivot or rotate about an axis when subject to pressure or force.

Compared to the trigger pedals known from the state of the art, the trigger pedal of the conveyor according to the invention is integrated into the end portion of the frame. This results in the rollers extending all the way until the end of the conveyor, without any gap. The absence of a gap makes the unload operation safer for an operator when the conveyor is e.g. situated on a mezzanine or in a picking tower.

Also, such a trigger pedal forms a part of the conveyor, allowing for a more compact device.

Furthermore, this entails an assembly advantage over the state of the art, facilitating the installation on site.

Also a walk-in to the conveyor for maintenance work is much safer without any gap.

The coupling may comprise a knee-joint or toggle mechanism that is configured to pull the separator stop in the protruding position and to push the separator stop in the retracted position.

Exemplarily, the motion of the separator stop may be steered by the knee-joint mechanism to which the separator stop may be joined. The knee-joint mechanism may comprise a first bar and a second bar connected by a joint. The bars may rotate with respect to each other on the common axis of the joint, wherein the angle between the bars is limited to a certain range, e.g. it is constrained to be at most a bit above 180° (e.g. 181°) to ensure the self-locking but not too much above in order not to require too high forces for unlocking. For angles much greater than 180°, the knee-joint would require relatively high forces to be unlocked. The bars may for example be connected by a hinge. In another example, the first bar may comprise an arm extending at least partly over the second bar and the second bar may comprise a stopper on it. When the bars are at an angle of about 180°, the stopper on the second bar may serve as a barrier for the arm of the first bar and stop its movement.

The overall extension of the knee-joint mechanism is at its maximum when the bars are at an angle of about 180° (e.g. 181°). The knee-joint mechanism may be mounted within the frame such that the bars are orthogonal to the lateral beams and to the conveying plane when at an angle of about 180°. Therefore the separator stop may be joined to the bar in the upper position and the protruding position of the separator stop may correspond to the position of the bars at about 180° in the knee-joint mechanism. Conversely, the bars may be at an angle lower than about 180° when the separator stop is in the retracted position.

The coupling may further comprise at least one rod. The trigger pedal may be connected via the rod to the knee-joint mechanism, more precisely to the joint between the two bars. When the trigger pedal is pushed towards the end portion of the frame by a load, the rod is pulled towards the trigger pedal and transmits this pulling to the knee-joint mechanism, bringing the bars at about 180° and, thus, the separator stop in the protruding position. When the trigger pedal returns to its idle position, the rod is pushed towards the knee-joint mechanism, making the bars rotate away from the position at about 180° and bringing the separator stop in the retracted position.

Advantageously, the knee-joint mechanism is used in direct "push-pull" mode without using any additional kinematics to reverse the rod motion, and no spring or lever is needed to release the separator stop. Therefore, the separating device according to the present invention is capable of providing a separating function with a simpler structure that requires less components. Additionally, no linkage elements stick out of the side profile of the frame, thereby facilitating the installation on site.

Further, the fact that the rod is pulled rather than pushed when the trigger pedal is engaged by an incoming load makes the mechanism more robust.

Furthermore, the separator stop does not follow a trajectory orthogonal to the conveying plane when switching from the protruding position to the retracted position and vice versa, but rather it follows an arc. This lowers the friction between the separator stop and the load bearing against it, improving the mechanism of release of the separator stop.

The conveyor may comprise a manual release mechanism arranged in the end portion. In order to bring the trigger pedal back to its idle position and consequently release the separator stop, a release mechanism may be provided in the end portion of the frame. The release mechanism may comprise a hole in the external wall of the end portion. An operator may push the trigger pedal back into the idle position through the hole, e.g. with his foot. When the trigger pedal is pushed back in the idle position, the rod pushes the stop separator in the retracted position, as explained above. In particular, the single-element trigger pedal, when pushed, reverts immediately to its idle position protruding at least partly from the gap. For the two-element trigger pedal, the release element is pushed by the operator and this movement is transmitted via the connection to the engaging element, thus pushing the engaging element away from the block of the end portion back into the idle position.

Compared to other solutions known in the prior art, no dedicated unlocking mechanism is required, wherein conventional unlocking mechanism overhang in the operator area and/or protrude beyond the frame of the conveyor. Therefore the separator device according to the present invention is more compact and easier to ship, assemble and to operate. The shipment is made easier in that the assembled conveyor without overhang mechanism is more easily stackable and packable and the risk of damaging the sensitive mechanism is minimal. Further, a mechanism without any overhang would not be damaged by a fork-lift.

Furthermore, the release of the separator stop does not automatically occur once the load applying pressure on the trigger pedal is removed. The manual release of the separator stop achieved through the release mechanism above enables an operator to flexibly control the course of the operations.

The example with the two-element trigger pedal, in particular, has the advantage of a reduced vertical dimension over the single-element trigger pedal. Indeed, the block at the end portion does not have to extend beyond the height of the lateral beams. The reason is that the engaging element of the two-element trigger pedal is not enclosed within the block, so that the block needs not have room for the movement of the engaging element that has to pull the coupling.

In the one-element trigger pedal the upper part of the block has to be higher than the upper part of the trigger pedal, to allow the trigger pedal to be pushed inside the block. In turn, the upper part of the trigger pedal has to be above the conveying surface in order to be engaged from the incoming load. Conversely, in the two-element trigger pedal, the external wall needs not extend above the height of the lateral beams or the conveying surface, in order for the mechanism to work. However, the block has also a function of stop for the loads, so that a load does not fall off the conveyor. Therefore, the upper part of the block may extend above the conveying surface. The height of the block above the conveying surface is any case reduced with respect to the one-element trigger pedal and may be in the range of about 2 cm to about 4 cm. This small height facilitates the picking operation of a forklift truck.

Further, the movement of the trigger pedal when engaged by a load must be such that a sufficient pulling force is exerted on the coupling to trigger the separator stop. In the one-element trigger pedal, if the movement is e.g. a pivotal movement, it may be necessary for the trigger pedal to have a height that makes it extend below the lateral beams. Conversely, in the two-element trigger pedal, the block needs not extend below the lateral beams, since only the release element is fully accommodated therein. In other words, the end portion of the frame does not extend beyond the lateral beams in a downward direction orthogonal to the conveying direction. Thus, the profile can have the external wall extending only down to the base of the lateral beams and the bottom panel fixed directly to the lower surface of the lateral beams. Since no part extends underneath the end portion, it is possible to lay the conveyor directly on the ground. In other words, the underside of the lateral beams can be positioned in direct contact with the ground.

BRIEF DESCRIPTION OF THE DRAWINGS

FIGS. 2A and 2B are side views of an exemplary conveyor in operation.

DETAILED DESCRIPTION

In the following text, a detailed description of examples will be given with reference to the drawings. It should be understood that various modifications to the examples may be made. Unless explicitly indicated otherwise, elements of one example may be combined and used in other examples to form new examples.

Figure 1A:
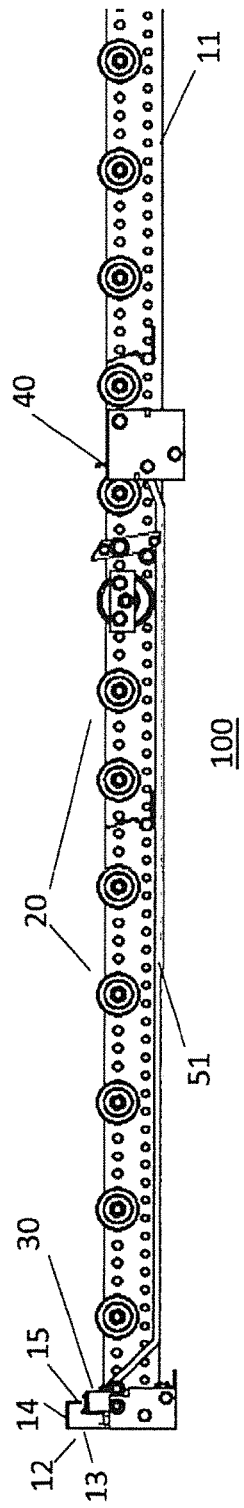
FIG. 1A is a side view of an exemplary conveyor and FIG. 1B id a top view of an exemplary conveyor.
Figure 1B:
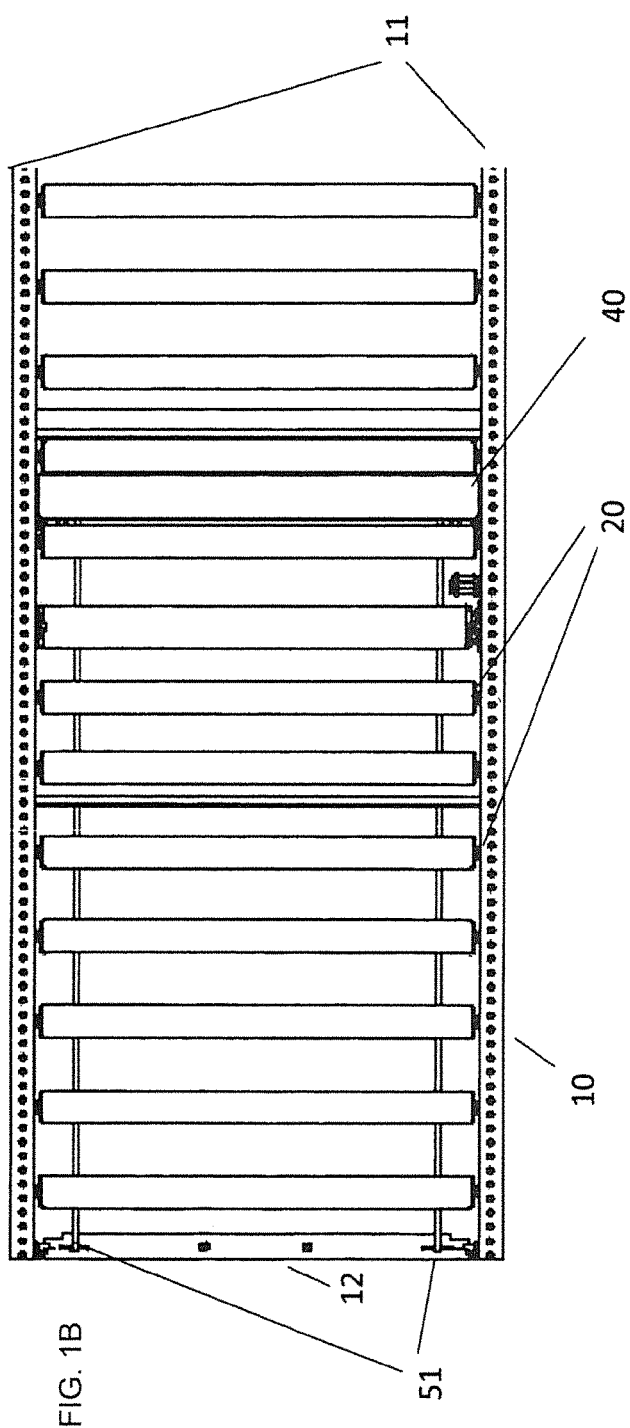

FIGS. 1A and 1B show a lateral view (FIG. 1A) and a top view (FIG. 1B) of a conveyor 100 according to a first embodiment. The frame 10 of the conveyor 100 comprises two beams 11 arranged parallel to each other in a direction along which loads or goods can be transported. They form the side boundary of the conveyor 100 and comprise a fixed position. Multiple rollers or cylinders 20 are arranged substantially perpendicular to the beams 11 to carry and transport goods or loads (goods or loads not shown in FIGS. 1A and 1B). The rollers 20 are mounted rotatable around their axes to transport the loads.

The frame 10 further comprises an end portion 12 positioned after the plurality of rollers 20, which may terminate in a block arranged orthogonally to and between the beams 11. The block may be a profile, which—viewed in cross-section—may have an external wall 13, a top panel 14 and an internal wall 15. As can be seen, in this first embodiment, the free end of the internal wall 15 is located above the conveying surface, in order to create a gap or open space for the upper part of the trigger pedal 30, allowing said upper part to be moved into the hollow interior space created by the aforementioned walls.

FIGS. 1A and 1B also show parts of a separator device comprising a trigger pedal 30, a separator stop 40, and a part of the coupling 50 (shown in FIGS. 2A and 2B), namely two rods 51, coupling the trigger pedal 30 and the separator stop 40. Instead of two rods, the coupling 50 may use poles or stiff wires.

FIGS. 2A and 2B show a lateral view of the conveyor 100 when a load 200 is being conveyed in the direction of the arrow C. FIG. 2B follows after FIG. 2A in time.

The separator stop 40 consists of a profile arranged basically parallel to the rollers 20 and extending between the lateral beams 11 of the frame 10. The trigger pedal 30 consists of a block, particularly a profile, basically parallel to the rollers 20 and perpendicular to the beams 11. The trigger pedal 30 is arranged within the end portion 12. In particular, in this first embodiment, in the engaged position the upper part of the trigger pedal 30 is contained inside a hollow portion of the profile of the end portion 12. In the idle position, the upper part of the trigger pedal 30 is at least partly protruding outside the hollow portion of the end portion 12 so that an oncoming load can easily activate the trigger pedal 30.

FIGS. 2A and 2B show that the coupling 50 comprises one of the rods 51 and a corresponding knee-joint mechanism 52. Following that, two rods 51 require two knee-joint mechanism that are preferably identical. The separator stop 40 is part of the knee-joint mechanism 52. The rods 51 connect the knee-joint mechanism 52 to the trigger pedal 30.

The knee-joint mechanism 52 comprises a first bar 53, a second bar 54 and the separator stop 40. The first bar 53 is hingedly attached to the lateral beams 11 at joint 55 and hingedly attached to the second bar 54 via joint 57. The second bar 54 is attached to the separator stop 40, which is hingedly attached to the lateral beams 11 at joint 56. The two bars 53 and 54 can rotate with respect to each other on a common axis around the joint 57.

The angle between the two bars 53 and 54 can increase from being acute (<180°) to being approximately straight (about 180°). When the angle between the bars is about 180°, the bars are in a traction position in which they are substantially aligned and they reach the maximum extension in the direction perpendicular to the beams 11.

Each of the rods 51 is connected at one end to the respective knee-joint mechanism 52, specifically at the joint 57. In this first embodiment, the other end of the rod 51 is attached to the upper part of the trigger pedal 30. In order to avoid tension between the trigger pedal 30 and the rod 51 when the trigger pedal 30 has moved or pivoted from the idle position to the engaged position, the connection of the free end of rod 51 and the trigger pedal 30 is not fixed but has one degree of freedom. For example, the free end of rod 51 can be arranged in a long hole or slotted hole. The main portion of rod 51 is substantially parallel to the beams 11, preferably below the rollers 20, whereas its free ends extend upwardly, since the attachments of the rod 51 to the knee-joint mechanism 52 and the trigger pedal 30 are situated above the main portion of the rod.

FIG. 2A shows the trigger pedal 30 according to the first embodiment in the idle position, wherein the trigger pedal 30 partially protrudes from the end portion 20 towards the rollers 20 and is ready to be engaged by a load. At the same time, the separator stop 40 is in the retracted position below the conveying surface because the knee-joint mechanism 52 is not in traction.

FIG. 2B shows the load 200 reaching the end portion 12 of the conveyor and pressing with its weight on the trigger pedal 30 according to the first embodiment. The pressure exerted by the load 200 makes the trigger pedal 30 tilt in the conveying direction, towards the interior of the profile of the end portion 12, i.e. farther away from the rollers 20 and the separator stop 40. The trigger pedal 30 is protected by the end portion 12 and cannot be overloaded by the load 200, when the rollers 20 are bent down because of the load 200. The functioning of the trigger pedal 30 is independent from the weight of the load 200. The coupling 50 formed by the rods 51 and the knee-joint mechanisms 52 is capable of transmitting to the separator stop 40 the movement applied to the trigger pedal 30. As mentioned, the rods 51 are connected on one end to the upper part of the trigger pedal 30, namely the part that comes into contact with the oncoming loads. On the other end the rods 51 are connected to the joint 57 between the two bars 53 and 54 of the knee-joint mechanism 52, so that a movement of the rods 51 can trigger a rotation of the bars 53 and 54 around the joint 57.

In such a configuration, when the trigger pedal 30 is pushed by the load 200, the rods 51 are pulled by the trigger pedal 30 in the conveying direction and, in turn, the rods 51 exert a pulling force on the knee-joint mechanisms 52. The pulling force brings the knee-joint mechanisms 52 in traction, moving the separator stop 40 from the retracted position to the protruding position above the conveying surface. Once in the protruding position, the separator stop 40 presents a barrier substantially orthogonal to the conveying surface and can prevent further oncoming loads from passing the position of the separator stop 40 and accumulating onto the end load 200.

The separator device described above is triggered by the arrival of a load 200 at the end portion 12 of the frame 10 of the conveyor 100. Once the load 200 is removed, the trigger pedal 30 cannot revert from its engaged position to the idle position but remains in the engaged position since no springs are provided in the device. Hence, the separator stop 40 remains in the protruding position and needs to be manually released.

Figure 3:
FIG. 3 is a perspective view of an exemplary conveyor.

FIG. 3 shows a perspective view of the conveyor 100, in which a release mechanism in the form of a hole 60 is visible. The hole 60 is provided in the external wall 13 of the end portion 12. Through the hole 60 the trigger pedal 30 can be pushed in the direction opposite the conveying direction back in the idle position. For example, an operator may use his foot to move the trigger pedal 30. Preferably, the hole 60 is positioned centrally in the end portion (i.e. approximately equidistant from the sides of the end portion 12 in the direction parallel to the rollers 20) to better prevent an accidental triggering of the pedal 30 by a fork-lift.

The force applied to the trigger pedal 30 through the hole 60 is transmitted via the coupling 50 to the separator stop 40. In particular, the rods 51 push the joint 57 of the knee-joint mechanisms 52 and make the bars 53 and 54 rotate to a configuration in which there is an acute angle formed between them. The knee-joint mechanism 52 reduces thereby its extension in the direction perpendicular to the beams 11 and the separator stop 40 is then lowered from the protruding position into the retracted position. Therefore, the separator stop 40 is released and a new load can be conveyed to the end portion 12 of the conveyor 100.

Figure 4:
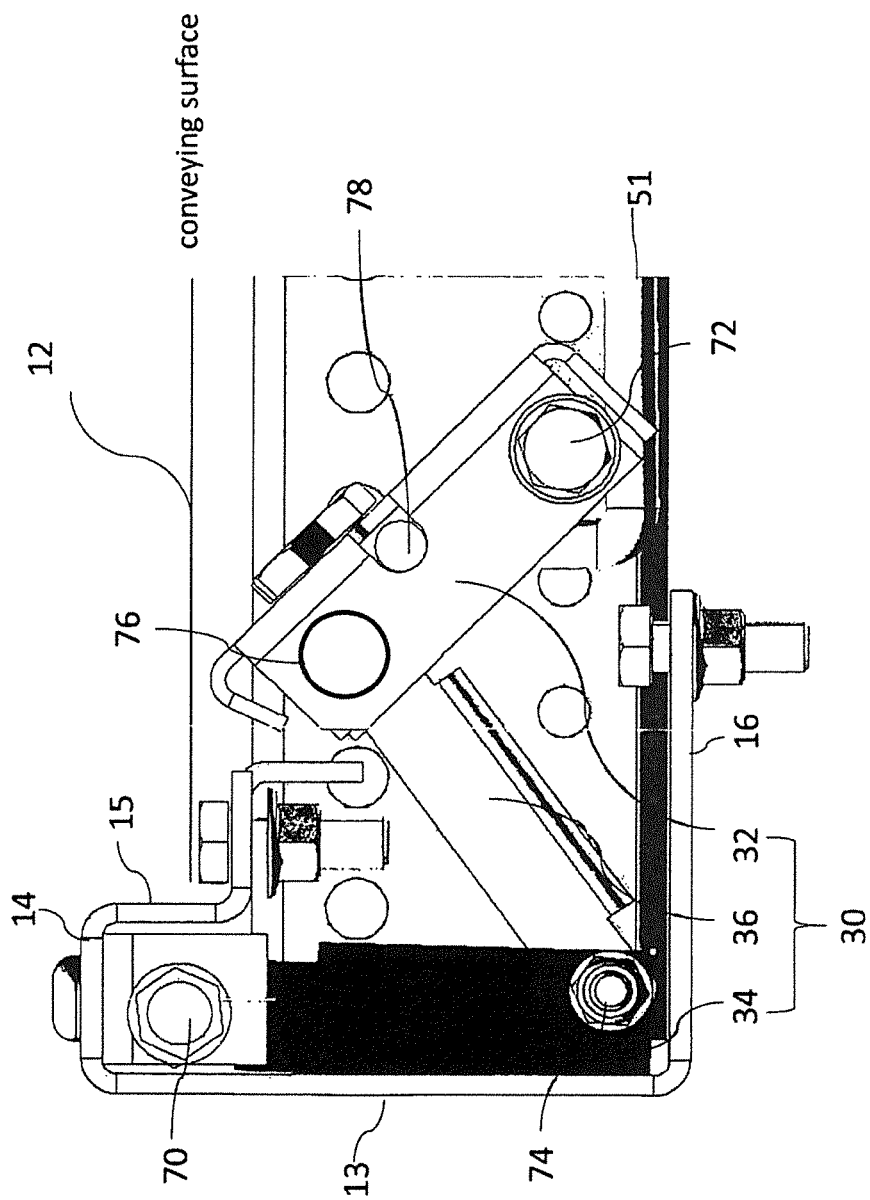
FIG. 4 is a side view of a trigger pedal for a conveyor according to a different example.

FIG. 4 shows a side view of a trigger pedal 30 for a conveyor according to a second embodiment. The functioning of the coupling 50 and the separator stop 40 with the trigger pedal 30 according to the second embodiment is the same as described for the first embodiment. In particular, when the trigger pedal 30 is pushed by the load 200, the rods 51 are pulled by the trigger pedal 30 in the conveying direction and, in turn, the rods 51 exert a pulling force on the knee-joint mechanisms 52. Also, through the release mechanism, the trigger pedal 30 can be pushed in the direction opposite the conveying direction back in the idle position.

However, the trigger pedal 30 according to the second embodiment does not comprise a unitarily-formed element as shown in FIGS. 1 (view A) and 2 (views A and B). The trigger pedal 30 of FIG. 4 comprises two different elements connected to each other, a first element or engaging element 32 configured to be engaged by an incoming load and a second element or release element 34 configured to be pushed via the release mechanism. The engaging element 32 and the release element 34 are connected via a connecting mechanism, such as a connecting element 36. Each of these elements may be a block, particularly a profile.

Like in the first embodiment, the profile of the end portion 12 has an external wall 13, a top panel 14 and an internal wall 15. FIG. 4 additionally shows a bottom panel 16. The difference with the first embodiment is that the internal wall 15 extends below the conveying surface until it meets the lateral beams 11. In one example, the internal wall 15 bends at around 90° to extend parallel to the lateral beams 11. In other words, the internal wall 15 may have at least a first portion substantially perpendicular to the lateral beams 11 and a consecutive second portion substantially parallel to the lateral beams 11. The second portion may be exemplarily fixed e.g. by means of a screw to one or both of the lateral beams 11.

The trigger pedal 30 is arranged within the end portion 12. In particular, in this second embodiment, the release element 34 may be fully accommodated within the profile, i.e. each side of the release element 34 faces at least partly the inner side of the walls 13, 15 and the panels 14, 16 of the profile. In the engaged position, the release element 34 may be substantially parallel to the rollers 20 and perpendicular to the conveying direction. The engaging element 32 is also within the end portion 12, i.e. after the rollers 20, but it is at least partly outside the profile. In particular, no side of the engaging element 32 faces the inner side of the inner wall 15.

The trigger pedal 30 has two joints, 70 and 72, at which it is hingedly connected to the frame 10 of the conveyor 100. The elements of the trigger pedal 30 can rotate or pivot around joints 70 and 72, which constitute the fixed points of the trigger pedal 30 with respect to the frame 10. In particular, the engaging element 32 can pivot around joint 72 positioned in the lower part of the engaging element 32, and the release element 34 can pivot around joint 70 positioned in the upper part of the release element 34. For example, fixed point 70 may be located between the external wall 13 and the internal wall 15 of the profile of the end portion 12. The engaging element 32 is hingedly connected to the connecting element 36 via joint 76, which is positioned in the upper parts of the engaging element 32 and of the connecting element 36. The release element 34 is hingedly connected to the connecting element 36 via joint 74, which is positioned in the lower parts of the release element 34 and of the connecting element 36.

The rod 51 of the coupling 50 is attached to attaching point 78 of the engaging element 32, wherein the attaching point 78 may be located around the middle of the engaging element in between joints 72 and 76.

In the idle position, the upper part of the engaging element 32 is at least partly protruding above the conveying surface so that an incoming load can easily activate the trigger pedal 30. In the engaged position, as shown in FIG. 4, the upper part of the engaging element 30 is below the conveying surface, so that the load can reach the end of the conveyor, where it is stopped by the inner wall 15. For example, in the engaged position, the engaging element 32 and the connecting element 36 may be at an angle of about 90° with respect to each other and the connecting element 36 may be at an angle of about 45° with respect to the release element 34.

When a load reaches the end portion 12 of the conveyor, it presses with its weight on the engaging member 32 of the trigger pedal 30. The pressure exerted by the load makes the engaging member 32 pivot in an anti-clockwise manner around joint 72, so that upper part of the engaging member moves at the same time in the conveying direction, i.e. farther away from the rollers 20 and the separator stop 40, and downwards, i.e. away from the conveying surface. The movement in the conveying direction pulls the rod 51 of the coupling 50, as in the first embodiment.

The angle between the engaging element 32 and the connecting element 36 in the idle position may be smaller than the angle therebetween in the engaged position, e.g. smaller than 90°. Also, in the idle position, the release element 34 is removed from a position substantially perpendicular to the conveying direction. Indeed, the upper part of the release element 34 is fixed at point 70 and the lower part is situated closer to the rollers 20 because of the connecting element 36 and the engaging element 32, which protrude above the conveying surface.

Under the pressure of the load, also the upper part of the connecting element 36, which is joined to the engaging element 32, is moved in the conveying direction and downwards. The downward movement widens the angle between the engaging element 32 and the connecting element 36. The release element 34 is also affected by the pressure of the load via the connecting element 36 and moves in the conveying direction to arrive at a position substantially perpendicular to the conveying direction.

From the engaged position shown in FIG. 4 the trigger pedal 30 returns to the idle position via the release mechanism. In the example shown in FIG. 3, a hole 60 is provided in the external wall 13 of the end portion 12. Through the hole 60 the release member 34 can be pushed in the direction opposite the conveying direction. The release member 34 pivots around joint 70, so that the lower part of the release member 34 moves upwards and in the direction opposite the conveying direction. The release member 34 remains in this configuration when in the idle position.

Since the connecting member 36 is joined to the release member 34 at joint 74, the connecting member 36 also moves upwards and in the direction opposite the conveying direction and transmits this movement to the engaging member 32 via joint 76. When moving in the direction opposite the conveying direction, the engaging member 32 carries the end of the rod 51 with it, thereby pushing the rod 51 of the coupling 50, as in the first embodiment.

The invention claimed is:

1. A conveyor (100) for conveying loads along a conveying direction, comprising:
a frame (10),
a plurality of rollers (20) mounted in the frame (10),
a trigger pedal (30) movable between an idle position and an engaged position,
a separator stop (40) movable between a retracted position and a protruding position,
a coupling (50) between the trigger pedal (30) and the separator stop (40) for transmitting to the separator stop (40) a movement applied to the trigger pedal (30), and
a manual release mechanism; wherein:
the frame (10) has an end portion (12) positioned after the plurality of rollers (20) in the conveying direction, the manual release mechanism is arranged in the end portion (12) and the trigger pedal (30) is arranged within the end portion (12);
the coupling (50) comprises a knee-joint mechanism (52) and is configured to pull the separator stop (40) in the protruding position and to push the separator stop (40) in the retracted position;
the trigger pedal (30) comprises an engaging element (32) configured to be engaged by a load and a release element (34) configured to be engaged by the manual release mechanism, the engaging element (32) and the release element (34) being connected;
the frame (10) comprises two lateral beams (11) extending in the conveying direction and the end portion (12) of the frame (10) does not extend beyond the lateral beams (11) in a downward direction orthogonal to the conveying direction;
the engaging element (32) and the release element (34) are connected via a connecting element (36);
the engaging element (32) is connected hingedly to the connecting element (36) via a first joint (76) that is positioned in upper parts of the engaging element (32) and the connecting element (36); and
the release element (34) is connected hingedly to the connecting element (36) via a second joint (74) that is positioned in lower parts of the release element (34) and the connecting element (36).

2. The conveyor (100) according to claim 1, wherein: the end portion (12) comprises the end part of the lateral beams (11) after the plurality of rollers (20) and a profile aligned orthogonally to the lateral beams (11);
the profile of the end portion (12) comprises an internal wall (15), a top panel (14) and an external wall (13), wherein the internal wall (15) extends down to the lateral beams (11); and
the release element (34) is fully accommodated inside the profile of the end portion (12); and the engaging element (32) is at least partly outside of the profile.

3. The conveyor (100) according to claim 1, wherein the trigger pedal (30) comprises one unitarily-formed element that is configured to be engaged by an incoming load to move in the engaged position and to be engaged by the manual release mechanism to move back in the idle position.

4. The conveyor (100) according to claim 1, wherein the manual release mechanism comprises a hole (60) in an external wall (13) of the end portion (12).

5. The conveyor (100) according to claim 4, wherein the hole (60) is centrally positioned in the end portion (12).

6. The conveyor (100) according to claim 1, wherein the rollers (20) extend all the way until the end of the conveyor (100) without any gap.

7. A conveyor (100) for conveying loads along a conveying direction, comprising:
   a frame (10),
   a plurality of rollers (20) mounted in the frame (10),
   a trigger pedal (30) movable between an idle position and an engaged position,
   a separator stop (40) movable between a retracted position and a protruding position,
   a coupling (50) between the trigger pedal (30) and the separator stop (40) for transmitting to the separator stop (40) a movement applied to the trigger pedal (30), and
   a manual release mechanism, wherein:
   the frame (10) has an end portion (12) positioned after the plurality of rollers (20) in the conveying direction, the manual release mechanism is arranged in the end portion (12) and the trigger pedal (30) is arranged within the end portion (12);
   the coupling (50) comprises a knee-joint mechanism (52) and is configured to pull the separator stop (40) in the protruding position and to push the separator stop (40) in the retracted position;
   the trigger pedal (30) comprises an engaging element (32) configured to be engaged by a load and a release element (34) configured to be engaged by the manual release mechanism, the engaging element (32) and the release element (34) being connected;
   the frame (10) comprises two lateral beams (11) extending in the conveying direction and the end portion (12) of the frame (10) does not extend beyond the lateral beams (11) in a downward direction orthogonal to the conveying direction;
   the end portion (12) comprises the end part of the lateral beams (11) after the plurality of rollers (20) and a profile placed orthogonally to the lateral beams (11);
   the profile of the end portion (12) comprises an internal wall (15), a top panel (14) and an external wall (13); and
   the internal wall (15) extends downwards without reaching a conveying surface formed by the tops of the plurality of rollers (20).

8. The conveyor (100) according to claim 7, wherein: the engaging element (32) and the release element (34) are connected via a connecting element (36),
   the engaging element (32) is hingedly connected to the connecting element (36) via a first joint (76) that is positioned in upper parts of the engaging element (32) and the connecting element (36), and
   the release element (34) is hingedly connected to the connecting element (36) via a second joint (74) that is positioned in lower parts of the release element (34) and the connecting element (36).

9. The conveyor (100) according to claim 7, wherein an upper part of the trigger pedal (30) is contained inside the profile of the end portion (12) and the trigger pedal (30) is configured to tilt in the conveying direction towards the interior of the profile of the end portion (12) when pressure is exerted on the trigger pedal (30).

10. The conveyor (100) according to claim 7, wherein the trigger pedal (30) comprises one unitarily-formed element that is configured to be engaged by an incoming load to move in the engaged position and to be engaged by the manual release mechanism to move back in the idle position.

\* \* \* \* \*